April 15, 1941.    L. I. PICKERT    2,238,505
SANDER
Filed Feb. 9, 1940    2 Sheets-Sheet 2
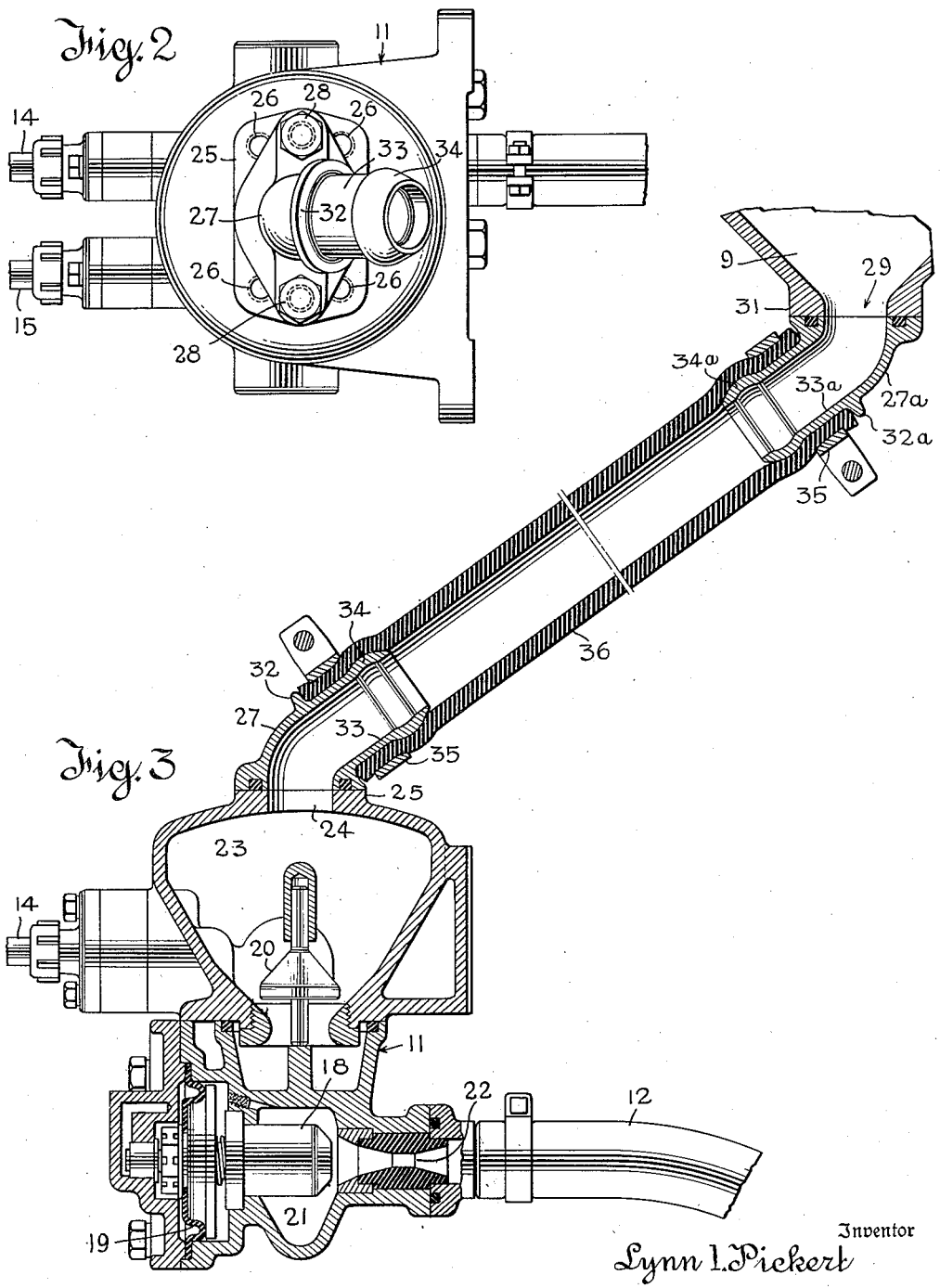

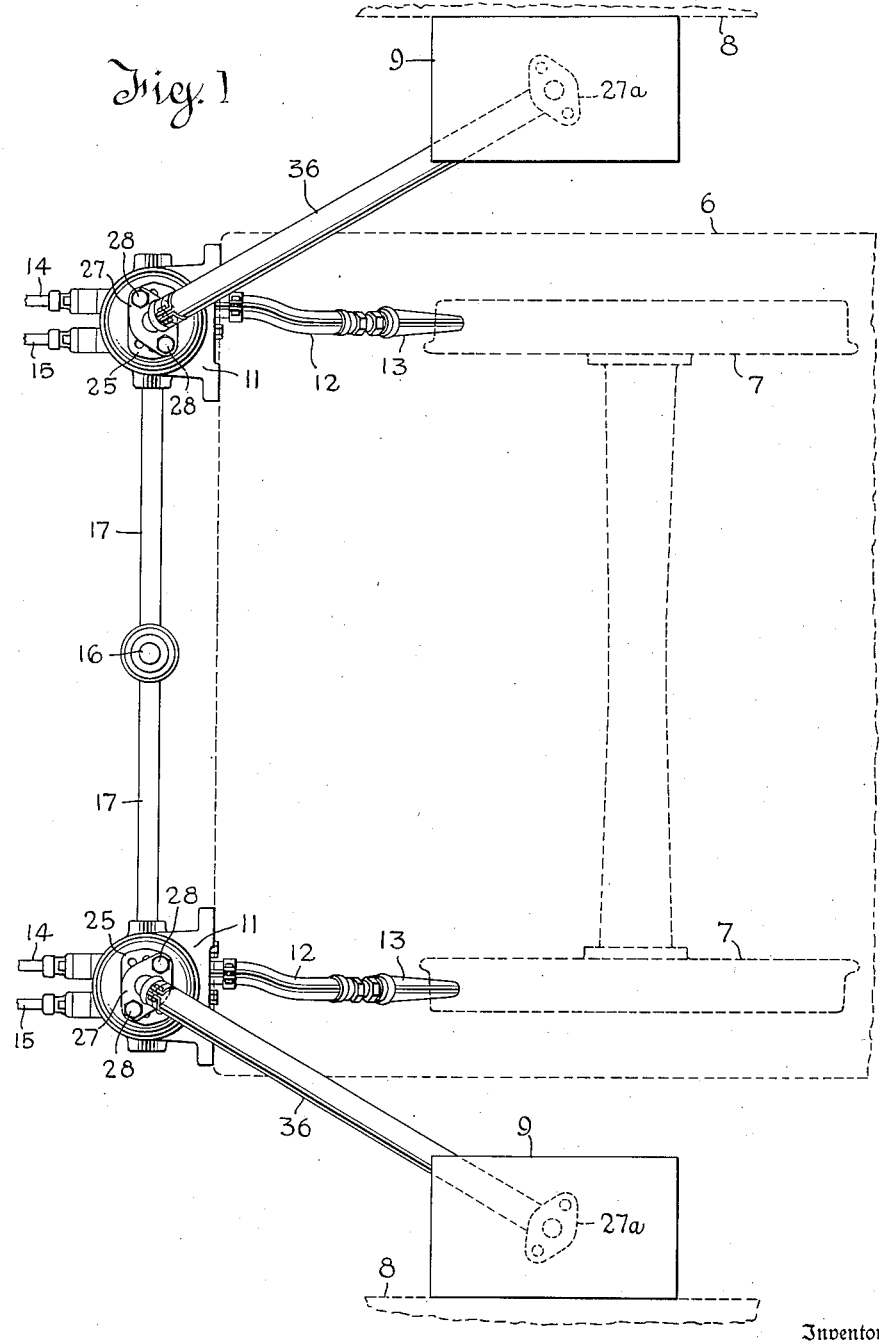

Patented Apr. 15, 1941

2,238,505

UNITED STATES PATENT OFFICE 2,238,505

SANDER

Lynn I. Pickert, Watertown, N. Y., assignor to The New York Air Brake Company, a corporation of New Jersey Application February 9, 1940, Serial No. 318,171

3 Claims. (Cl. 291—44)

This invention relates to sanders for railway cars and particularly to gravity sand-feed connections between body-mounted sand boxes and truck-mounted sand traps.

In high speed braking, the trend is toward the use of pneumatic sand traps on every truck with means to operate the traps in all brake applications, or in all brake applications above a given intensity. Such traps require to be fed by sand boxes of such considerable volume that space for them cannot always be had on the truck and they must then be mounted on the car body.

Since the truck-mounted trap has considerable motion relatively to the body, both because of the swiveling action of the truck and because of the suspension spring elements between the truck frame and the center-bearing, a flexible sand conduit is necessary.

Heretofore, recourse has been had to canvas reinforced rubber hose which is looped sufficiently to accommodate the relative motion, but in many cases this is not practicable because in some positions the loop will offer a sand pocket which arrests or retards objectionably the gravity flow of sand from the box to the trap.

According to the present invention, recourse is had to a longitudinally stretchable hose mounted under tension such that it draws straight in the relative position of closest approach of trap and sand box, and always has an inclination at least steep enough to ensure active sand flow.

A satisfactory hose can be made of gum rubber without reinforcement. Because longitudinal stretching of the hose involves reduction of transverse area, the untensioned hose is oversized sufficiently to compensate. Bulb-ended hose-connecting fittings are used to maintain circular configuration despite lateral flexure and to minimize local over-stressing.

An illustrative embodiment of the invention is shown in the accompanying drawings, in which:

Figure 1 is a diagrammatic plan view showing the relative positions of two traps and two sand boxes for a single swiveling truck.

Figure 2 is a plan view of the trap on a larger scale.

Figure 3 is a section, axially through the trap, the trap feeding hose and the hose connection to the sand box.

In the above figures are shown some details of a sand box invented by another. This is chosen merely as an example of modern commercial practice. Any gravity fed trap may be substituted.

In Figure 1, a truck frame 6 and one pair of wheels 7 are indicated in dotted lines. Portions of the car body (such as sills or underframe) are indicated in dotted lines at 8. The truck frame 6 swivels under the car body 8 in any usual manner and the truck structure also would ordinarily include suspension springs permitting vertical motion of the body 8 relatively to the frame 6. As such arrangements are conventional and subject to considerable variation in detail, illustration appears unnecessary to a comprehension of the present invention.

Sand boxes are indicated at 9 and are fixedly supported on the car body 8. Two sand traps 11 are fixedly mounted on truck frame 6. These are arranged to sand rail ahead of respective wheels 7 by discharging sand through hose 12 and nozzles 13 of known form.

Each trap has an impulse air connection 14 by which clean-out air is delivered to the trap and a sanding air connection 15 by which sanding air is delivered to the trap. The air control valve is not illustrated.

An air filter and moisture excluder 16 admits atmospheric air to stirring jet connections 17 leading to each trap. Air so supplied flows to a stirring jet in each trap. In Figure 3, 18 represents a combined intercepting valve and ejector nozzle, and motor diaphragm 19 operates the intercepting valve to control clean-out operations.

When the ejector nozzle is operative, sand is drawn from chamber 21 and fed through throat 22 to hose 12. Sand is supplied to chamber 21 by gravity flow from local sand reservoir 23 past distributor 20. All the sand trap details so far described are inventions of another.

The present invention has to do with delivery of sand from each box 9 to the corresponding local sand reservoir 23.

At the top of reservoir 23 is an inlet port 24 surrounded by a bolting face or pad 25. In this are two arcuate series of tapped holes 26 for attachment of fitting 27 in any one of three positions differing in angle about a vertical axis. (Compare the showings in Figures 1 and 2). Two machine screws 28 are used for connection.

The sand box 9 has in its bottom a discharge port 29 with bolting pad 31 identical in all respects with pad 25. On pad 31 is a fitting 27a conveniently identical in all respects with fitting 27. Hence, a description of fitting 27 will suffice.

The fitting 27 is a sort of elbow, the angle being chosen to suit the particular installation, so that in the normal or mean position the ends of fittings 27 and 27a can be directed approximately toward each other as indicated in Figure 3. The fitting 27 has a flange 32 beyond which is a neck 33 which merges with a ball-like enlargement 34.

Drawn over the fittings 27, 27a and clamped by hose bands 35 behind the enlargements 34 is an elongatable hose 36, preferably formed of gum rubber devoid of any reinforcement which would inhibit elongation.

The hose 36 is stretched sufficiently to ensure that it will not sag at any time. Preferably, it is under moderate tension at the closest approach of fittings 27, 27a.

The angle of inclination to the horizontal should be such as to ensure free gravity flow of sand at all times, and any constriction of the hose which can be occasioned by stretch must be small enough to avoid interruption of flow.

Various embodiments are possible and changes of dimension will be entailed by various installations. The invention assures gravity flow in cases where looped hose cannot be used, particularly where the interval between the sand box and trap is rather short and the movement of the truck rather large.

What is claimed is:

1. A gravity feed conduit for truck-mounted sanders subject to limited displacement relatively to a sand supply unit, said conduit comprising a globular-ended hose connection on the sander; a globular-ended hose connection on the supply unit; and a longitudinally stretchable hose stretched over and clamped behind the globular ends of said connections and held in sufficient tension between the same to maintain it approximately straight in all positions of the sander.

2. The combination of a car having a body and a truck supporting the body and capable of limited motion relatively thereto; a sand box fixedly mounted relatively to the body; a sand trap carried by said truck; a sand discharge fitting on the box and a sand inlet fitting on the trap, said fittings being directed toward one another in such relative positions, when the truck is positioned normally relatively to the body, as to receive the ends of a substantially straight connecting hose inclined downward toward the track at an angle at least as steep as the angle of repose of sand; and longitudinally stretchable hose connecting said fittings and tensioned sufficiently to maintain it substantially straight in all operative truck positions.

3. The combination of a car comprising a body and a truck supporting said body and capable of limited swiveling motion relatively thereto; a sand discharge fitting on the body; a sand inlet fitting on the truck; and a longitudinally stretchable hose connecting said fittings, the fittings being directed toward one another in such relative positions that in the position of closest approach of the fittings the hose is held thereby substantially straight, and in all other and more remote positions of the fittings the hose is stretched longitudinally and consequently held straight.

LYNN I. PICKERT.